US012027800B2

(12) United States Patent
Nozaki et al.

(10) Patent No.: US 12,027,800 B2
(45) Date of Patent: Jul. 2, 2024

(54) CONNECTOR INCREASING ACCURACY OF POSITIONING TERMINAL TAB INTO THE MOVING PLATE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 392 days.

(21) Appl. No.: 17/617,562

(22) PCT Filed: Jun. 4, 2020

(86) PCT No.: PCT/JP2020/022034

§ 371 (c)(1),
(2) Date: Dec. 8, 2021

(87) PCT Pub. No.: WO2020/261913

PCT Pub. Date: Dec. 30, 2020

(65) Prior Publication Data

US 2022/0239040 A1 Jul. 28, 2022

(30) Foreign Application Priority Data

Jun. 25, 2019 (JP) ................................ 2019-117007

(51) Int. Cl.
*H01R 13/64* (2006.01)
*H01R 13/453* (2006.01)
*H01R 13/629* (2006.01)

(52) U.S. Cl.
CPC ......... *H01R 13/64* (2013.01); *H01R 13/4538* (2013.01); *H01R 13/62938* (2013.01)

(58) Field of Classification Search
CPC .............. H01R 13/64; H01R 13/62938; H01R 2107/00; H01R 13/4538; H01R 13/502; H01R 13/02; H01R 13/40
See application file for complete search history.

(56) References Cited

U.S. PATENT DOCUMENTS 6,623,285 B2 * 9/2003 Nishide .............. H01R 13/4538 439/157
9,373,913 B2 * 6/2016 Noda ............... H01R 13/62938
(Continued)

FOREIGN PATENT DOCUMENTS

JP 2003-068401 A 3/2003
JP 2017-188244 A 10/2017
(Continued)

OTHER PUBLICATIONS

International Search Report dated Aug. 18, 2020 for WO 2020/261913 A1 (4 pages).

*Primary Examiner* — Travis S Chambers
(74) *Attorney, Agent, or Firm* — Venjuris, P.C.

(57) ABSTRACT

A connector having a moving plate that performs positioning of a tab in an excellent manner. This connector comprises: a first housing having a terminal-holding part and a hood part; a male terminal fitting with a tab protruding into the hood part; a second housing that is closely fitted with the first housing; and a moving plate that positions a front-end part of the tab and is capable of moving inside the hood part, the tab penetrating through the moving plate. The moving
(Continued)

plate has a protrusion formed such that a hole edge section of a positioning hole within a first facing surface that faces the second housing is caused to protrude forward. When the moving plate is in an initial position, the front end of the tab is positioned farther toward the rear than a virtual protective surface to which the outer surface of the protrusion is extended forward.

4 Claims, 7 Drawing Sheets

(56) References Cited

U.S. PATENT DOCUMENTS

| | | | |
|---|---|---|---|
| 10,340,621 | B2 | 7/2019 | Hirota et al. |
| 2004/0242084 | A1 | 12/2004 | Fujita |

FOREIGN PATENT DOCUMENTS

| | | | |
|---|---|---|---|
| WO | 2018/074227 | A1 | 4/2018 |
| WO | 2019/026562 | A1 | 2/2019 |
| WO | 2019/102837 | A1 | 5/2019 |

* cited by examiner

CONNECTOR INCREASING ACCURACY OF POSITIONING TERMINAL TAB INTO THE MOVING PLATE

CROSS REFERENCE TO RELATED APPLICATIONS

This application is a national phase of PCT application No. PCT/JP2020/022034, filed on 4 Jun. 2020, which claims priority from Japanese patent application No. 2019-117007, filed on 25 Jun. 2019, all of which are incorporated herein by reference.

TECHNICAL FIELD

The present disclosure relates to a connector.

BACKGROUND

A connector described in Patent Document 1 includes a moving plate for positioning tabs arranged in a housing body. The tabs are passed through holes formed in the moving plate. In a non-connected state where a mating housing is not connected, the moving plate is at an initial position and tip parts of the tabs project from the moving plate.

PRIOR ART DOCUMENT

Patent Document

Patent Document 1: JP 2018-181786 A
Patent Document 2: JP 2017-188244 A

SUMMARY OF THE INVENTION

Problems to be Solved

In the case of considering added-up tolerances of the respective components, if the tolerances are large, the tabs are possibly detached from the moving plate. Thus, projection dimensions of the tabs from the moving plates are preferably large. However, if dimensions of the tabs projecting from the moving plate are made long, the tabs may interfere with a mating connector when the moving plate is inclined. As a countermeasure against this, it is considered to thicken the moving plate and make the through holes longer. However, if the moving plate is thickened, the external dimensions of the connector become large. Therefore, a method for increasing insertion margins of the tabs into the moving plate without thickening the moving plate and/or extending projection dimensions of the tabs is desired.

Accordingly, the present disclosure aims to provide a connector capable of reliably positioning a tab without thickening a moving plate and extending a projection dimension of the tab from the moving plate.

Means to Solve the Problem

The present disclosure is directed to a connector with a first housing configured such that a receptacle projects forward from a terminal holding portion, a male terminal fitting held in the terminal holding portion, a tab of the male terminal fitting projecting into the receptacle, a second housing to be connected to the first housing by entering the receptacle, and a moving plate including a positioning hole, the tab being passable through the positioning hole, the moving plate being movable n the receptacle between an initial position for positioning a front end part of the tab and a connection position rearward of the initial position, wherein the moving plate includes a projection formed by causing a hole edge part of the positioning hole to project forward on a first facing surface facing the second housing, the second housing includes a recess formed by recessing a part facing the projection, out of a second facing surface facing the moving plate, and a front end of the tab is located rearward of a virtual protection surface defined by extending an outer surface of the projection obliquely forward when the moving plate is at the initial position.

Effect of the Invention

According to the present disclosure, a tab can be reliably positioned by a moving plate.

DETAILED DESCRIPTION TO EXECUTE THE INVENTION

Description of Embodiments of Present Disclosure

Figure 1:
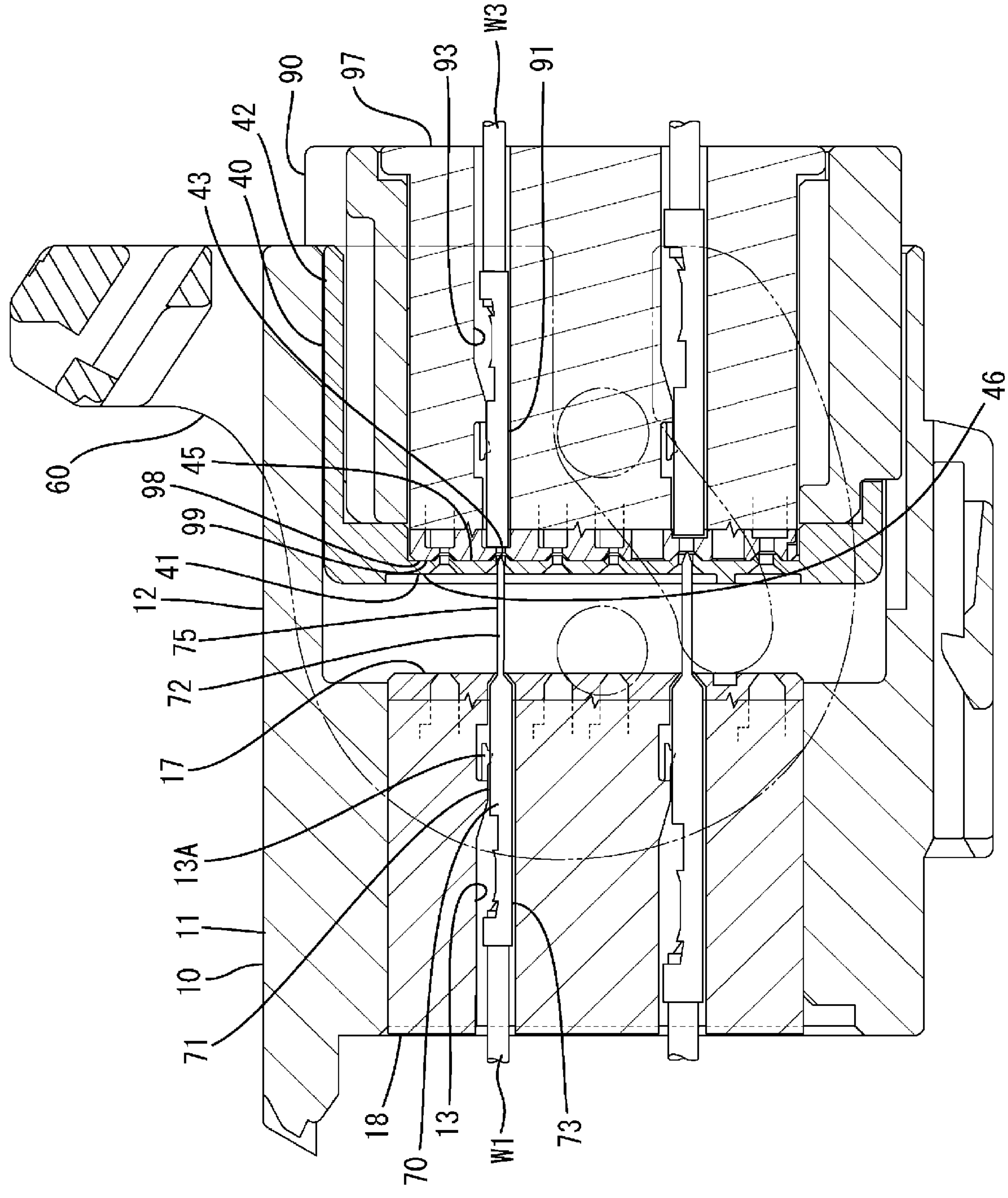
FIG. 1 is a side view in section of a connector of a first embodiment showing a state where a moving plate is at an initial position and a second facing surface of a second housing inserted into a receptacle and a first facing surface of the moving plate are in contact with each other.
Figure 2:
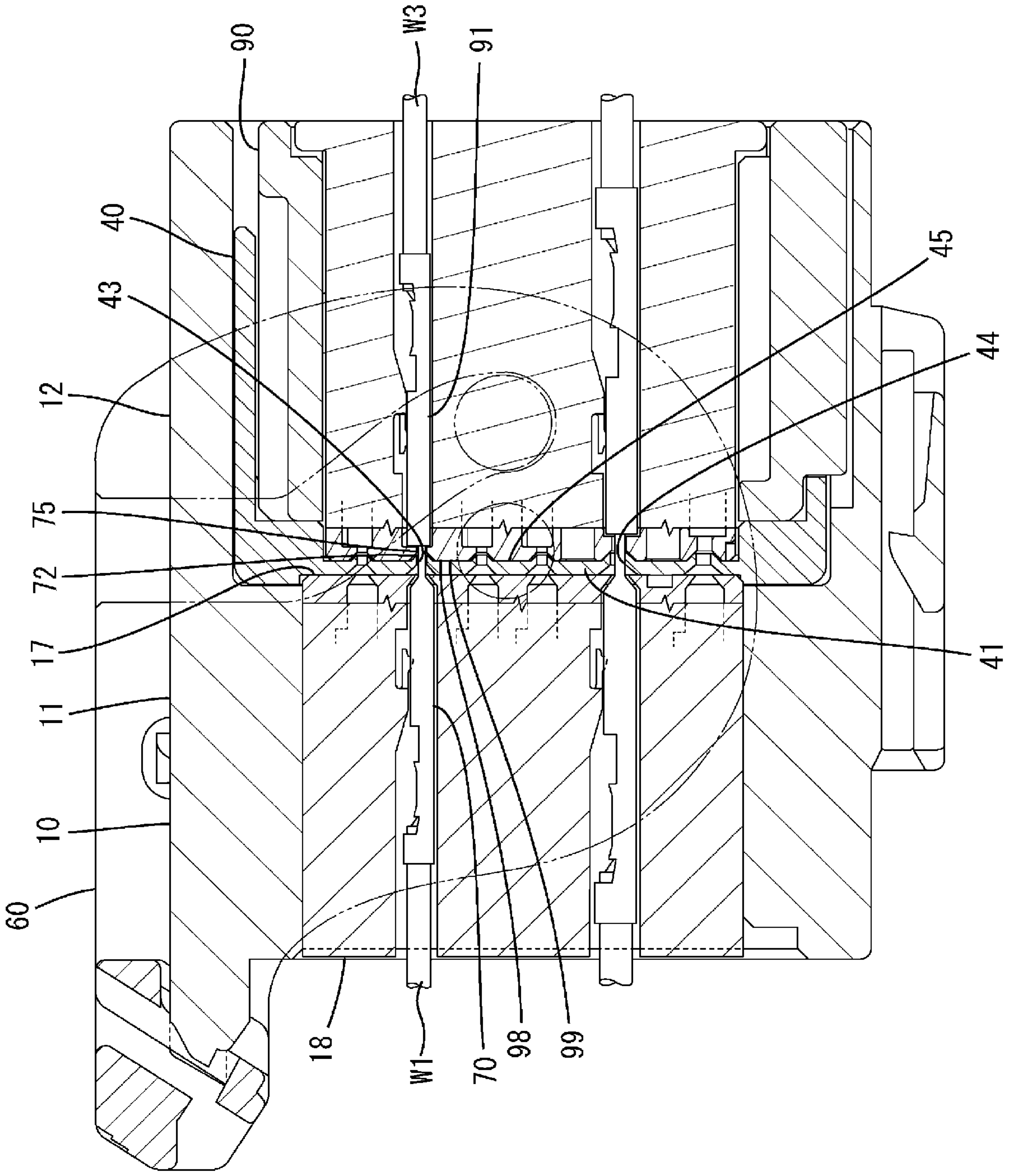
FIG. 2 is a side view in section of the connector of the first embodiment showing a state where the moving plate is at a connection position and male terminal fittings are connected to female terminal fittings.

First, embodiments of the present disclosure are listed and described.

(1) The connector of the present disclosure includes a first housing configured such that a receptacle projects forward from a terminal holding portion, a male terminal fitting held in the terminal holding portion, a tab of the male terminal fitting projecting into the receptacle, a second housing to be connected to the first housing by entering the receptacle, and a moving plate including a positioning hole, the tab being passable through the positioning hole, the moving plate being movable n the receptacle between an initial position for positioning a front end part of the tab and a connection position rearward of the initial position, wherein the moving plate includes a projection formed by causing a hole edge part of the positioning hole to project forward on a first facing surface facing the second housing, the second housing includes a recess formed by recessing a part facing the projection, out of a second facing surface facing the moving plate, and a front end of the tab is located rearward of a virtual protection surface defined by extending an outer surface of the projection obliquely forward when the moving plate is at the initial position.

According to the configuration of the present disclosure, since a front-rear length of the positioning hole becomes longer by as much as the projection is provided, there is no possibility that the positioning hole is detached from the tab and the reliability of a positioning function is high even if the moving plate is shifted forward. Further, since the front end of the tab is located rearward of the virtual protection surface, the tab is unlikely to interfere with the second housing even if the moving plate is inclined.

(2) Preferably, the tab of the connector of the present disclosure includes a tapered portion constituting a front end part of the tab and shaped to become thinner toward a front side and a tab body portion constituting a region of the tab behind the tapered portion, and a rear end of the tapered portion is disposed in the positioning hole.

According to this configuration, since the tab body portion has a larger outer shape than the tapered portion and has a higher rigidity than the tapered portion, the reliability of the positioning function is higher as compared to a configuration in which only the tapered portion is disposed in the positioning hole.

(3) The connector of the present disclosure is preferably such that a front-rear central part of the tapered portion is disposed in the positioning hole.

If the front-rear central part of the tapered portion is located forward of the front end of the positioning hole, a projection dimension of the tab from the front end of the projection is large. Thus, there is a high possibility that the tab interferes with the second housing. In contrast, if the front-rear central part of the tapered portion is disposed in the positioning hole, the projection dimension is suppressed to be small even if the tab projects further forward than the projection. Thus, interference with the second housing can be prevented.

(4) The connector of the present disclosure is preferably such that a clearance is formed between the projection and the recess when the first and second facing surfaces come into contact with each other.

According to this configuration, since the first and second facing surfaces can be reliably brought into contact with each other, the first and second housings can be smoothly connected.

(5) Preferably, a front end surface parallel to the first facing surface is formed on a front end of the projection of the connector of the present disclosure.

According to this configuration, since it can be suppressed that the projection becomes too thin on the front end of the projection, the deformation of a front end part of the projection by the tab can be prevented.

Details of Embodiments of Present Disclosure

First Embodiment

Hereinafter, a connector according to a first embodiment of the present invention is described with reference to FIGS. 1 to 5. The connector according to the first embodiment includes a first housing 10, male terminal fittings 70, a moving plate 40, a lever 60 and a second housing 90. The first and second housings 10, 90 are connected by rotating the lever 60. Note that, in the following description, a surface side (right side in FIGS. 1 to 5) of the first housing 10 facing the second housing 90 when connection is started is referred to as a front side concerning a front-rear direction, and upper and lower sides shown in FIGS. 1 to 5 are directly defined as upper and lower sides concerning a vertical direction.

[Configuration of Connector]

The first housing 10 is made of synthetic resin and includes a terminal holding portion 11 having a substantially rectangular parallelepiped shape and a tubular receptacle 12 integrally projecting forward from an outer peripheral part of the front end of the terminal holding portion 11. The second housing 90 is inserted into the receptacle 12, whereby the second and first housings 90, 10 are connected. The moving plate 40 is disposed in the receptacle 12 movably between a later-described initial position and a later-described connection position rearward of the initial position.

The terminal holding portion 11 includes first cavities 13. A plurality of the first cavities 13 are aligned and arranged in the vertical direction. Each first cavity 13 extends in the front-rear direction and is open in a front surface part 17 of the terminal holding portion 11. The male terminal fitting 70 to be described later is inserted into each first cavity 13 from behind. The male terminal fitting 70 is retained and held in the first cavity 13 by a locking lance 13A provided in the first cavity 13 being fit and locked to a lance receiving portion (not shown). A projecting base end part of each tab 72 to be described later is arranged in an opening of each first cavity 13 in the front surface part 17 of the terminal holding portion 11.

The male terminal fitting 70 is integrally formed, such as by bending a conductive metal plate, and has a shape elongated in the front-rear direction as a whole. The male terminal fitting 70 includes a tubular terminal body portion 71, the tab 72 projecting forward from the terminal body portion 71 and a barrel portion 73 connected behind the terminal body portion 71. The tab 72 includes a tapered portion 74 constituting a front end part of the tab 72 and a tab body portion 75 constituting a region of the tab 72 behind the tapered portion 74 (see FIGS. 3 and 4). The rear end of the tab body portion 75 is connected to the front end of the terminal body portion 71.

Figure 3:
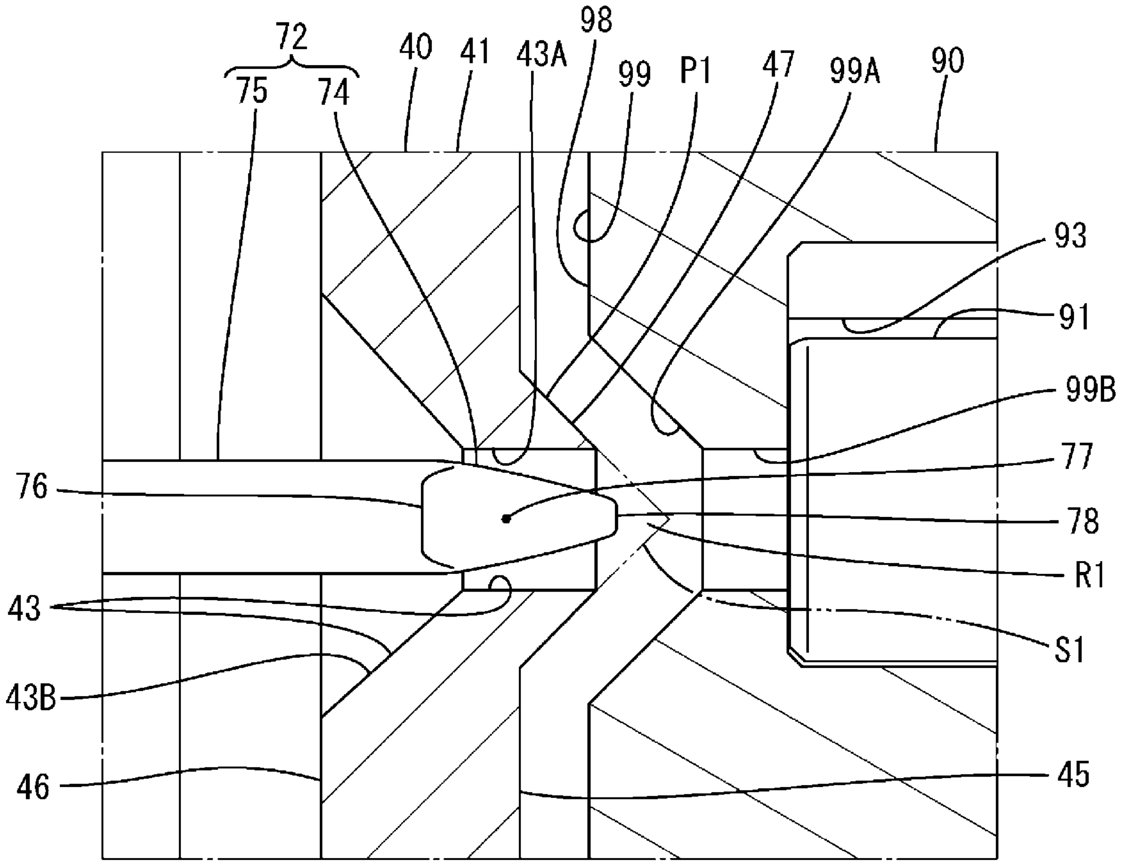
FIG. 3 is an enlarged side view in section of a main part of the connector of the first embodiment enlargedly showing a tip part of the male terminal fitting and a tip part of the female terminal fitting in a state where the moving plate is at the initial position and the second facing surface of the second housing inserted into the receptacle and the first facing surface of the moving plate are not in contact with each other.
Figure 4:
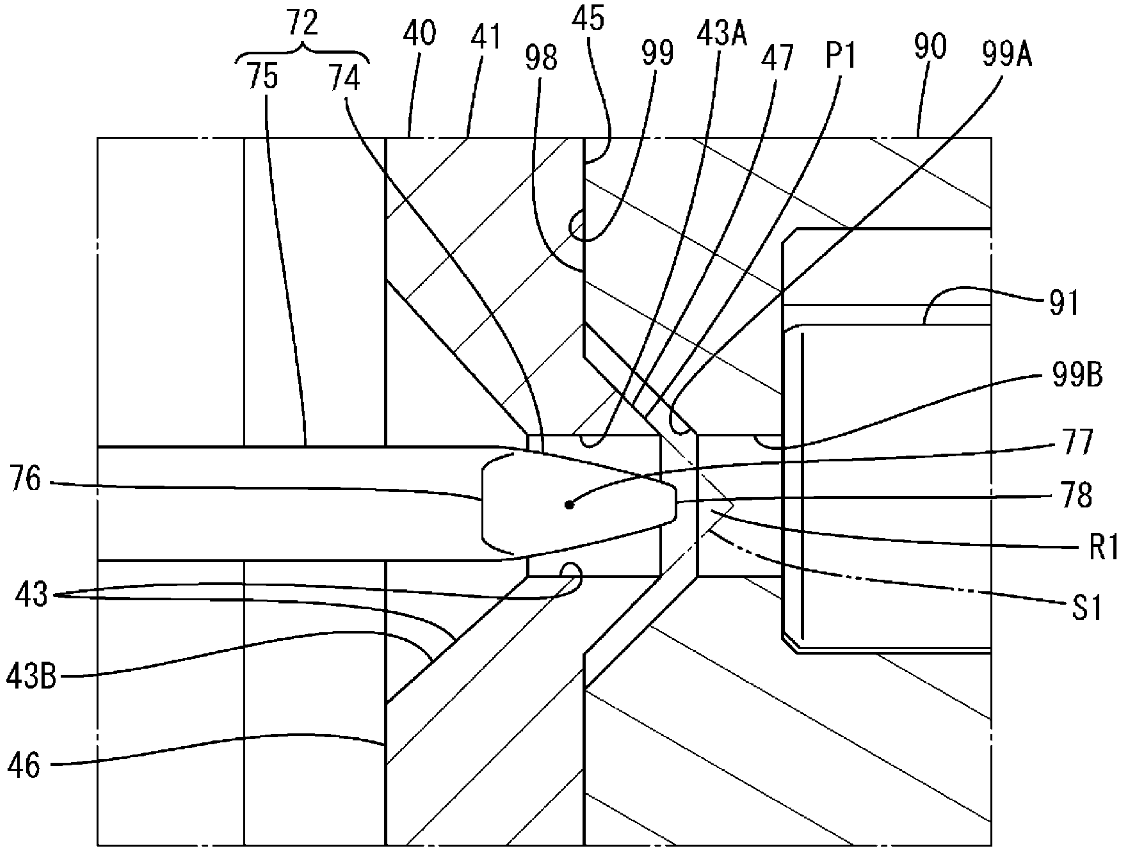
FIG. 4 is an enlarged side view in section of the main part of the connector of the first embodiment enlargedly showing the tip part of the male terminal fitting and the tip part of the female terminal fitting in the state where the moving plate is at the initial position and the second facing surface of the second housing inserted into the receptacle and the first facing surface of the moving plate are in contact with each other.

The tapered portion 74 is formed into such a tapered shape as to have vertical and lateral dimensions (only a shape in the vertical direction is shown in FIGS. 3 and 4) gradually reduced from the tab body portion 75 toward a front side (see FIGS. 3 and 4). The tab body portion 75 and the tapered portion 74 have a rectangular (square) cross-sectional shape along a direction orthogonal to the front-rear direction. Vertical and lateral dimensions of a rear end 76 of the tapered portion 74 are equal to those of the tab body portion 75. In this embodiment, an intermediate part between the rear end 76 and a front end 78 of the tapered portion 74 is defined as a front-rear central part 77. An end part of a wire W1 is connected to the barrel portion 73.

The moving plate 40 is accommodated in the receptacle 12. The moving plate 40 is made of synthetic resin and includes a plate body portion 41 in the form of a flat plate having a plate thickness direction oriented in the front-rear direction and a tubular peripheral wall portion 42 integrally projecting forward from an outer peripheral part of the plate body portion 41.

The plate body portion 41 is rectangular (square) in a front view of the plate body portion 41 (not shown). The plate body portion 41 is disposed to cover the front surface part 17 of the terminal holding portion 11 when the inside of the receptacle 112 is viewed from front. The front surface of the plate body portion 41 (surface of the plate body portion 41 on a side opposite to the terminal holding portion 11 of the first housing 10) serves as a first facing surface 45 facing a rear surface part 98 of the second housing 90. The rear surface of the plate body portion 41 (surface of the plate body portion 41 facing the terminal holding portion 11 of the first housing 10) serves as a third facing surface 46.

Figure 5:
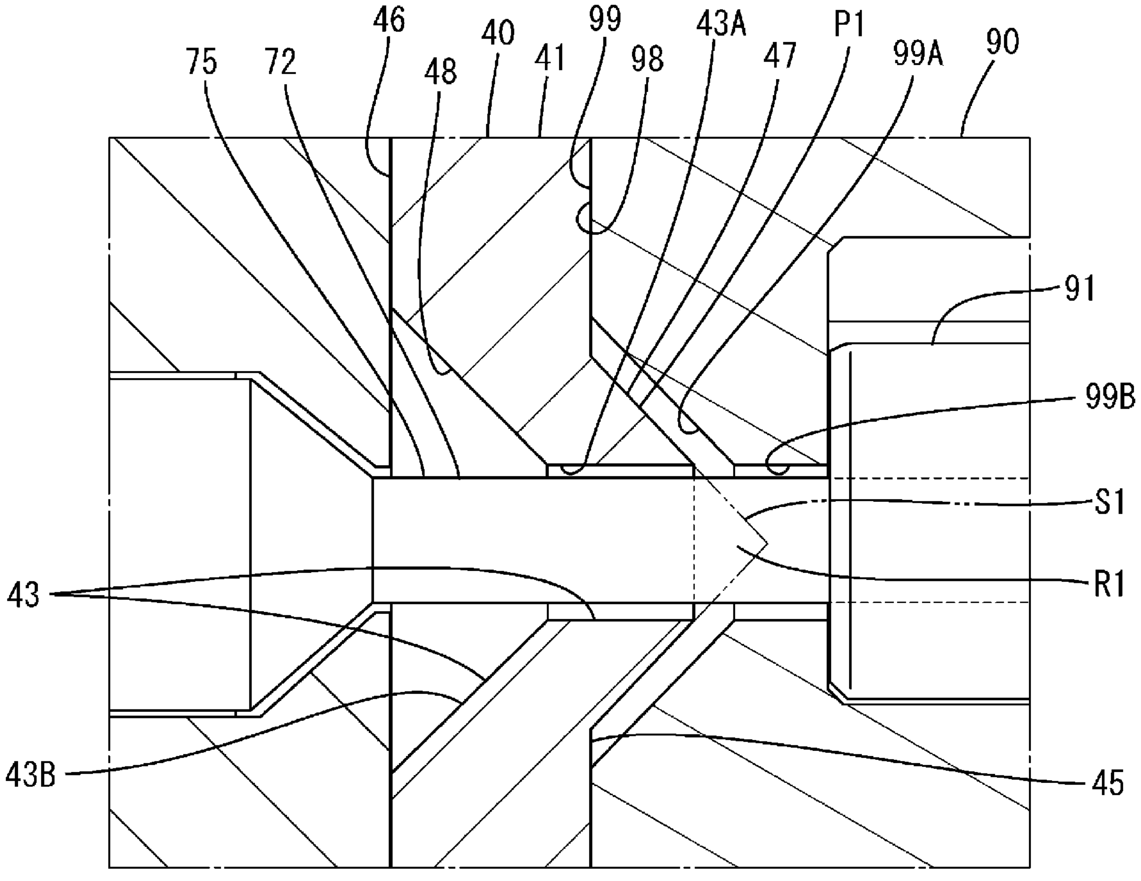
FIG. 5 is an enlarged side view in section of the main part of the connector of the first embodiment showing the state where the moving plate is at the connection position and the male terminal fitting is connected to the female terminal fitting.

As shown in FIGS. 3 to 5, the plate body portion 41 is formed with a plurality of positioning holes 43. The plurality of positioning holes 43 penetrate through a plurality of parts facing the plurality of first cavities 13 from the first facing surface 45 to the third facing surface 46. Each positioning hole 43 includes a positioning portion 43A and a guiding portion 43B. The positioning portion 43A constitutes a front end side region of the positioning hole 43. A cross-sectional shape of the positioning portion 43A perpendicular to the front-rear direction (penetrating direction of the positioning hole 43) is constant (same) from the front end to the rear end of the positioning portion 43A and is rectangular (square). Vertical and lateral dimensions of a cross-section of the positioning portion 43A are equal to or slightly smaller than those of the tab body portion 75. Each tab 72 is positioned to and inserted through each positioning hole 43.

A cross-sectional shape of the guiding portion 43B perpendicular to the front-rear direction is rectangular (square), similarly to the positioning portion 43A. Vertical and lateral dimensions (only a shape in the vertical direction is shown in FIGS. 3 and 4) of a cross-section of the guiding portion 43B gradually increase from the front end (rear end of the positioning portion 43A) to the rear end of the guiding portion 43B.

A projection 47 projecting forward is integrally formed on a hole edge part of each positioning holes 43 on the first facing surface 45 of the plate body portion 41. An outer surface P1 of each projection 47 is formed into such a tapered shape as to have vertical and lateral dimensions (only a shape in the vertical direction is shown in FIGS. 3 and 4) gradually reduced from the first facing surface 45 toward the front side. An angle of inclination of the outer surface P1 of each projection 47 is approximately 45°. The outer shape of the projection 47 is a four-side pyramid shape. The inner surface of a hole (center hole of the projection 47) formed in each projection 47 is flush and continuous with the inner surface of the positioning portion 43A of each positioning hole 43. In other words, the hole formed in each projection 47 is a forward extension of each positioning hole 43. That is, the center hole of the projection 47 constitutes a front end part of the positioning portion 43A of the positioning hole 43.

The moving plate 40 is accommodated into the receptacle 12 and movable between the initial position (see FIG. 1) where the plate body portion 41 is separated forward from the front surface part 17 of the terminal holding portion 11 and the connection position (see FIG. 2) where the plate body portion 41 is closer to the front surface part 17 than at the initial position and the third facing surface 46 is in contact with the front surface part 17.

When the moving plate 40 is at the initial position, a front end part (projecting tip part) of each tab 72 is inserted and positioned in each positioning hole 43 (see FIGS. 3 and 4). Specifically, with the moving plate 40 disposed at the initial position, the rear end 76 and the front-rear central part 77 of the tapered portion 74 of each tab 72 are disposed in each positioning hole 43 as shown in FIG. 3. More specifically, the rear end 76 of the tapered portion 74 is disposed in a front end part of the guiding portion 43B. The front-rear central part 77 is disposed in the positioning portion 43A.

When the moving plate 40 is at the initial position, the front end 78 of each tab 72 is located forward of the projection 47 (see FIGS. 3 and 4). The front end 78 of each tab 72 is located rearward of a virtual protection surface S1 extending obliquely forward along the outer surface P1 of the projection 47 (see FIGS. 3 and 4). In this embodiment, a region in front of the front end of the projection 47 and behind the virtual protection surface S1 is defined as a protection space R1 for protecting the tip part of the tab 72 from interference with the second housing 90. The outer shape of the protection space R1 is a four-sided pyramid shape (not shown).

The second housing 90 is made of synthetic resin and has a substantially rectangular parallelepiped shape. The second housing 90 is formed with a plurality of second cavities 93 extending in the front-rear direction and open in a front surface part 97 and the rear surface part 98 of the second housing 90. A female terminal fitting 91 is held in each second cavity 93 not to come out from the second cavity 93. An end part of a wire W3 is connected to the female terminal fitting 91. The rear surface part 98 of the second housing 90 is formed with a second facing surface 99 facing the moving plate 40 described above.

Recesses 99A recessed forward are formed on opening edge parts of openings of the respective second cavities 93, out of the second facing surface 99 (see FIGS. 3 to 5). With the second housing 90 connected to the first housing 10, the respective recesses 99A are formed at positions corresponding to the respective projections 47 of the moving plate 40. Each recess 99A is formed into such a tapered shape as to have vertical and lateral dimensions (only a shape in the vertical direction is shown in FIGS. 3 to 5) gradually reduced toward the front side (toward a back side) from the second facing surface 99.

Angles of inclination of surfaces forming each recess 99A with respect to the front-rear direction are approximately 45° and these surfaces are parallel to the outer surface P1 of the projection 47 and the virtual protection surface S1 defined by extending the outer surface P1. Each recess 99A has a four-sided pyramid shape. The rear surface part 98 of the second housing 90 is formed with tab insertion holes 99B from the front ends (back ends) of the respective recesses 99A to the second cavities 93. A cross-sectional shape of each tab insertion hole 99B along the front-rear direction is rectangular (square), similarly to the positioning hole 43. Vertical and lateral dimensions of a cross-section of each tab insertion hole 99B are constant from the front end to the rear end of the tab insertion hole 99B.

Next, functions and effects of the first embodiment are described. The respective tabs 72 are arranged to project into the receptacle 12 from the openings of the respective first cavities 13 of the front surface part 17. If the moving plate 40 is accommodated into the receptacle 12 and held at the initial position in the receptacle 12 as shown in FIGS. 1 and 3, the projecting tip parts of the respective tabs 72 are inserted and positioned in the respective positioning holes 43 of the plate body portion 41.

In this state, the front end 78 of the tab 72 (tapered portion 74) is located forward of the front end of the positioning hole 43 (projection 47) and rearward of the virtual protection surface S1 (in the protection space R1). The rear end 76 of the tapered portion 74 is located rearward of the positioning portion 43A (in the guiding portion 43B). The front-rear central part 77 of the tapered portion 74 is located in the positioning portion 43A.

If the second housing 90 is lightly fit into the receptacle 12 with the moving plate 40 located at the initial position, the second facing surface 99 of the second housing 90 comes into contact with the first facing surface 45 of the moving plate 40 (see FIGS. 1 and 4). At this time, each projection 47 of the first facing surface 45 is entirely accommodated in each recess 99A of the second facing surface 99 (see FIG. 4). A clearance is formed between the inner surface of each recess 99A and the outer surface P1 of each projection 47. In this way, it is prevented that the second facing surface 99 and the first facing surface 45 cannot come into surface contact with each other due to the contact of each recess 99 and each projection 47. By the surface contact of the first and second facing surfaces 45, 99, the second housing 90 and the moving plate 40 can be disposed to have a proper positional relationship in the front-rear direction.

The outer surface P1 of each projection 47 is parallel to the inner surface of the facing recess 99A. The front end of the projection 47 is located rearward of the front end of the recess 99A (rear end of the tab insertion hole 99B). The virtual protection surface S1 is parallel to the inner surface of the facing recess 99A and does not interfere with both the inner surface of the recess 99A and the inner surface of the tab insertion hole 99B. A front end part of the virtual protection surface S1 (protection space R1) is located in the tab insertion hole 99B.

If the lever 60 is rotated in this state, a cam action is exhibited between the lever 60 and the second housing 90, the connection of the first housing 10 and the second housing 90 proceeds and the moving plate 40 and the second housing 90 move rearward toward the connection position. Associated with this, the respective tabs 72 are inserted into the tab insertion holes 99B and inserted and connected to the respective female terminal fittings 91 while being kept positioned by the respective positioning holes 43 (see FIG. 5). In this way, the respective male terminal fittings 70 and the respective female terminal fittings 91 are electrically connected.

The connector of the present disclosure includes the first housing 10, the male terminal fittings 70, the second housing 90 and the moving plate 40. The first housing 10 is formed such that the receptacle 12 projects forward from the terminal holding portion 11. The male terminal fittings 70 are held in the terminal holding portion 11 and the tabs 72 project into the receptacle 12. The second housing 90 is connected to the first housing 10 by entering the receptacle 12. The moving plate 40 includes the positioning holes 43 through which the tabs 72 can be passed, and is movable between the initial position for positioning the front end parts of the tabs 72 and the connection position rearward of the initial position.

The moving plate 40 includes the projections 47 projecting forward from the hole edge parts of the positioning holes 43 on the first facing surface 45 facing the second housing 90. The second housing 90 includes the recesses 99A formed by recessing the parts facing the projections 47, out of the second facing surface 99 facing the moving plate 40. When the moving plate 40 is at the initial position, the front ends 78 of the tabs 72 are located rearward of the virtual protection surfaces S1 defined by extending the outer surfaces P1 of the projections 47 obliquely forward.

According to the configuration of the present disclosure, since front-rear lengths of the positioning holes 43 become longer by as much as the projections 47 are provided, there is no possibility that the tabs 72 come out of the positioning holes 43 and the reliability of a positioning function is high even if the moving plate 40 is shifted forward. Further, since the tapered portions 74 project forward from the positioning holes 43, there is a concern that the tapered portions 74 interfere with the second housing 90 when the moving plate 40 is inclined. However, since the front ends 78 of the tabs 72 are located rearward of the virtual protection surfaces S1, the tabs 72 are unlikely to interfere with the second housing 90.

The tab 72 of the connector of the present disclosure includes the tapered portion 74 constituting the front end part of the tab 72 and gradually thinned toward the front side, and the tab body portion 75 constituting the region of the tab 72 behind the tapered portion 74. The rear end 76 of the tapered portion 74 of the connector of the present disclosure is disposed in the positioning hole 43. The tab body portion 75 has a larger outer shape than the tapered portion 74 and has a higher rigidity than the tapered portion 74. According to this configuration, the reliability of the positioning function is higher as compared to a configuration in which only the tapered portion 74 is disposed in the positioning hole 43.

In the connector of the present disclosure, the front-rear central part 77 of the tapered portion 74 is disposed in the positioning hole 43. If the front-rear central part 77 of the tapered portion 74 is located forward of the front end of the positioning hole 43, a projection dimension of the tab 72 from the front end of the projection 47 is large. Thus, there is a high possibility that the tab 72 interferes with the second housing 90. In contrast, if the front-rear central part 77 of the tapered portion 74 is disposed in the positioning hole 43 as in the connector of the present disclosure, the projection dimension is suppressed to be small even if the tab body portion 75 projects forward from the projection 47. Therefore, interference with the second housing 90 can be prevented.

In the connector of the present disclosure, the clearances are formed between the projections 47 and the recesses 99A when the first and second facing surfaces 45, 99 come into contact with each other.

According to this configuration, since the first and second facing surfaces 45, 99 can be reliably brought into contact with each other, the first and second housings 10, 90 can be smoothly connected.

Second Embodiment

Figure 6:
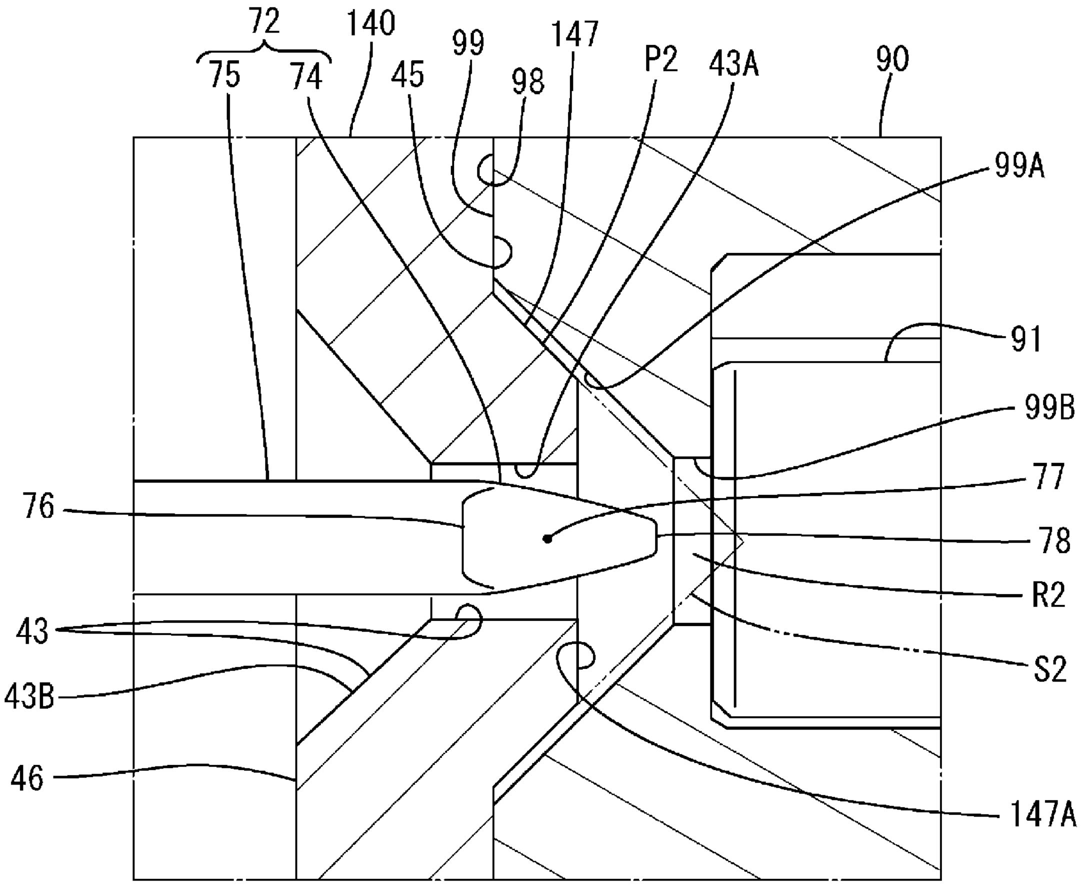
FIG. 6 is an enlarged side view in section of a main part of a connector of a second embodiment enlargedly showing a tip part of a male terminal fitting and a tip part of a female terminal fitting in a state where a moving plate is at an initial position and a second facing surface of a second housing inserted into a receptacle and a first facing surface of the moving plate are in contact with each other.

A second specific embodiment of the present disclosure is described with reference to FIG. 6. The second embodiment differs from the first embodiment in that a front end surface 147A is formed on a front end part of a projection 147. Since the other components are the same as in the first embodiment, the same components are denoted by the same reference signs and the structures, functions and effects thereof are not described.

The front end surface 147A parallel to a first facing surface 45 is formed on the front end part of the projection 147. With a moving plate 140 disposed at an initial position, a front end 78 of each tab 72 projects forward from the projection 147 and the front end surface 147A, but is located rearward of a virtual protection surface S2 extending obliquely forward along an outer surface P2 of the projection 147. A rear end 76 of each tab 72 is located in a positioning portion 43A.

With a second facing surface 99 of a second housing 90 held in contact with the first facing surface 45 of the moving plate 140, the front end 78 of the tab 72 and the front end surface 147A of the projection 147 are disposed in a recess 99A. However, the front end of the tab 72 is located in a protection space R2 (rearward of the virtual protection surface S2). The protection space R2 is located in the recess 99A and a tab insertion hole 99B, but does not interfere with the inner surface of the recess 99A and the inner surface of the tab insertion hole 99B. Thus, even if the moving plate 140 is inclined with respect to the second housing 90, the front end 78 of the tab 72 does not interfere with the inner surface of the recess 99A and the inner surface of the tab insertion hole 99B. The outer surface P2 of each projection 147 is parallel to the inner surface of the facing the recess 99A. The virtual protection surface S2 is parallel to the inner surface of the facing the recess 99A.

The front end of the projection 147 of the connector of the present disclosure is formed with the front end surface 147A parallel to the first facing surface 45. According to this configuration, it can be suppressed that the projection 147 becomes too thin on the front end of the projection 147, wherefore the deformation of a front end part of the projection 147 by the tab 72 can be prevented. The front end 78 of the tapered portion 74 projects further forward than the projection 147 and the front end of the positioning hole 43, but the rear end 76 of the tapered portion 74 (i.e. front end of the tab body portion 75) is located in the positioning portion 43A. Therefore, the tab 72 is reliably positioned by the fitting of a front end part of the tab body portion 75 and the positioning portion 43A.

Third Embodiment

Figure 7:
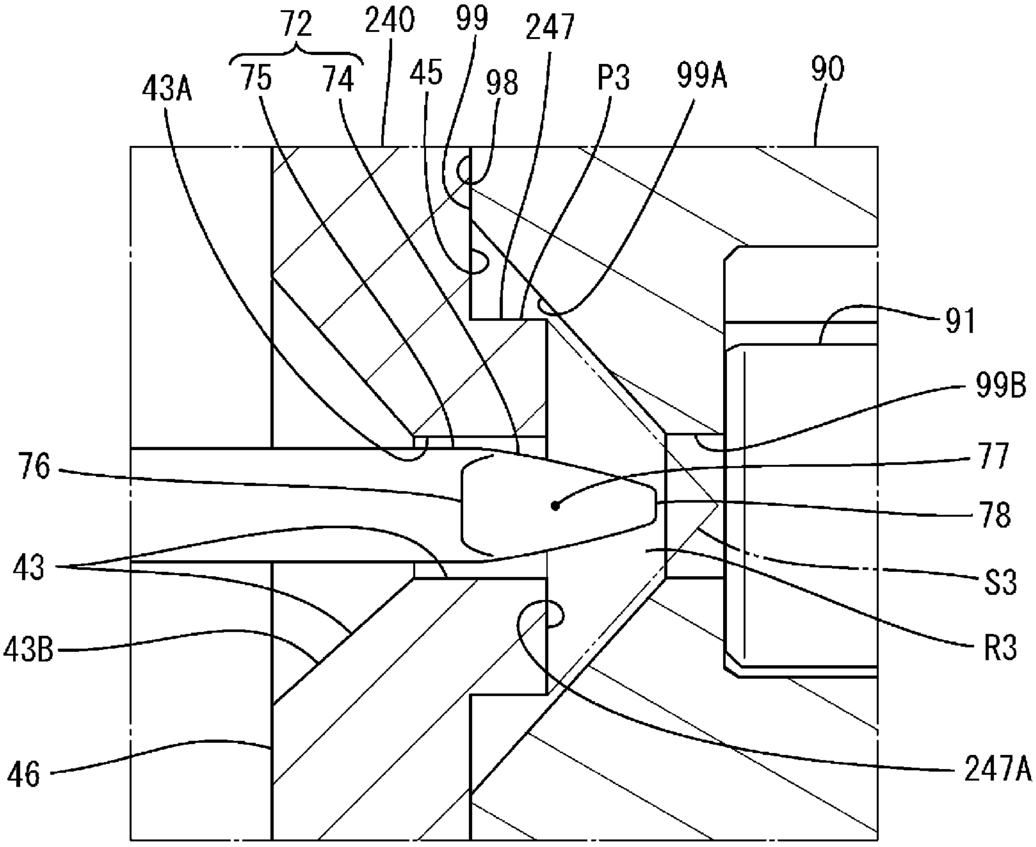
FIG. 7 is an enlarged side view in section of a main part of a connector of a third embodiment enlargedly showing a tip part of a male terminal fitting and a tip part of a female terminal fitting in a state where a moving plate is at an initial position and a second facing surface of a second housing inserted into a receptacle and a first facing surface of the moving plate are in contact.

A third specific embodiment of the present disclosure is described with reference to FIG. 7. The third embodiment differs from the first and second embodiments in that an outer surface P3 of a projection 247 extends in the front-rear direction and a virtual protection surface S3 is not an extension of the outer surface P3 of the projection 247 and differs from the first embodiment in that a front end surface 247A is formed on a front end part. Since the other components are the same as in the first embodiment, the same components are denoted by the same reference signs and the structures, functions and effects thereof are not described.

The outer surface P3 of the projection 247 extends in the front-rear direction. The outer surface P3 of the projection 247 has a rectangular cross-sectional shape perpendicular to the front-rear direction (not shown). The outer shape of the projection 247 is a rectangular parallelepiped shape. A front end part of the projection 247 is formed with the front end surface 247A parallel to a first facing surface 45. With a moving plate 240 disposed at an initial position, a front end 78 of each tab 72 (tapered portion 74) is located forward of the projection 247 and the front end surface 247A.

The front end 78 of each tab 72 is located rearward of the virtual protection surface S3 extending from the front end of the outer surface P3 of the projection 247 toward a position in front of a center of the front end surface 247A. An angle of inclination of the virtual protection surface S3 with respect to the front-rear direction is substantially the same as that of the inner surface of a recess 99A of the second housing 90. That is, the virtual protection surface S3 is parallel to the inner surface of the facing recess 99A.

With the moving plate 240 disposed at the initial position, a rear end 76 of the tapered portion 74 of each tab 72 is disposed in a positioning hole 43 (positioning portion 43A). Thus, the tab 72 is positioned by the fitting of a front end part of the tab body portion 75 and the positioning portion 43A. With the moving plate 240 disposed at the initial position, a front-rear central part 77 of the tapered portion 74 of each tab 72 is located forward of the projection 247 and the front end surface 247A and disposed in the protection space R3.

With a second facing surface 99 of the second housing 90 held in contact with the first facing surface 45 of the moving plate 240, the entire projection 247 and the front end surface 247A are disposed in the recess 99A. Further, the front end 78 of the tab 72 is accommodated in the protection space R3. The protection space R3 is located in the recess 99A and a tab insertion hole 99B, but does not interfere with the inner surface of the recess 99A and the inner surface of the tab insertion hole 99B. Therefore, even if the moving plate 240 is inclined with respect to the second housing 90, there is no possibility that the front end of the tab 72 interferes with the inner surface of the recess 99A.

Other Embodiments

The present invention is not limited to the above described and illustrated embodiments and is represented by claims. The present invention is intended to include all changes in the scope of claims and in the meaning and scope of equivalents and also include the following embodiments.

(1) Although the angle of inclination of the outer surface of the projection with respect to the front-rear direction is approximately 45° in the first embodiment, the angle of inclination of the outer surface with respect to the front-rear direction may be larger or smaller than 45°.

(2) Although the angle of inclination of the recess with respect to the front-rear direction is approximately 45° in the first embodiment, this angle of inclination may be larger than 45°.

(3) Although one type of male terminal fittings and one type of female terminal fittings are used as male terminal fittings and female terminal fittings in the first embodiment, two or more types of male terminal fittings and two or more types of female terminal fittings having different outer shapes may be used.

(4) Although the projections are provided on all the positioning holes in the first embodiment, the projections may be provided on only some of the positioning holes.

(5) Although the front end surface is formed in parallel to the first facing surface in the second and third embodiments, the front end surface may be formed at a predetermined angle to the first facing surface.

(6) Although the outer shape of the projection is a four-sided pyramid shape in the first embodiment and is a rectangular parallelepiped shape in the third embodiment, the outer shape of the projection may be a truncated conical shape, a cylindrical shape or another polygonal shape.

(7) The present invention is also applicable to connectors including no lever.

(8) Although the rear end of the tapered portion is located rearward of the positioning portion (in the guiding portion) in the first embodiment, the rear end of the tapered portion may be located in the positioning portion.

(9) Although the rear end of the tapered portion is located in the positioning portion (forward of the guiding portion) in the second and third embodiments, the rear end of the tapered portion may be located in the guiding portion (rearward of the positioning portion).

LIST OF REFERENCE NUMERALS

10 . . . first housing
11 . . . terminal holding portion
12 . . . receptacle
13 . . . first cavity
13A . . . locking lance
17 . . . front surface part
40, 140, 240 . . . moving plate
41 . . . plate body portion
42 . . . peripheral wall portion
43 . . . positioning hole
43A . . . positioning portion parallel portion
43B . . . guiding portion
45 . . . first facing surface
46 . . . third facing surface
47, 147, 247 . . . projection
60 . . . lever
70 . . . male terminal fitting
71 . . . terminal body portion
72 . . . tab
73 . . . barrel portion
74 . . . tapered portion
75 . . . tab body portion
76 . . . rear end of tapered portion
77 . . . front-rear central part of tapered portion
78 . . . front end of tab (tapered portion)
90 . . . second housing
91 . . . female terminal fitting
93 . . . second cavity
97 . . . front surface part
98 . . . rear surface part
99 . . . second facing surface
99A . . . recess
99B . . . tab insertion hole
147A, 247A . . . front end surface
P1, P2, P3 . . . outer surface of projection
R1, R2, R3 . . . protection space
S1, S2, S3 . . . virtual protection surface
W1, W3 . . . wire

What is claimed is:

1. A connector, comprising:

a first housing configured such that a receptacle projects forward from a terminal holding portion;

a male terminal fitting held in the terminal holding portion, a tab of the male terminal fitting projecting into the receptacle;

a second housing to be connected to the first housing by entering the receptacle; and a moving plate including a positioning hole, the tab being passable through the positioning hole, the moving plate being movable in the receptacle between an initial position for positioning a front end part of the tab and a connection position rearward of the initial position, wherein:

the moving plate includes a projection formed by causing a hole edge part of the positioning hole to project forward on a first facing surface facing the second housing, and a guiding portion formed by gradually enlarging the positioning hole toward a rear side on a surface facing the terminal holding portion of the first housing, the second housing includes a recess formed by recessing a part facing the projection, out of a second facing surface facing the moving plate, a dimension in a front-rear direction of the guiding portion is larger than that of the projection, a front end of the tab is located rearward of a virtual protection surface defined by extending an outer surface of the projection obliquely forward when the moving plate is at the initial position, the tab includes a tapered portion constituting a front end part of the tab and shaped to become thinner toward a front side, and a tab body portion constituting a region of the tab behind the tapered portion, the positioning hole includes a positioning portion forming a front end side region of the positioning hole, having a constant cross-sectional shape perpendicular to the front-rear direction from a front end to a rear end and having a rectangular shape, and a front-rear central part of the tapered portion is disposed in the positioning hole.

2. The connector of claim 1, wherein a rear end of the tapered portion is disposed in the positioning hole.

3. The connector of claim 1, wherein a clearance is formed between the projection and the recess when the first and second facing surfaces come into contact with each other.

4. The connector of claim 1, wherein a front end surface parallel to the first facing surface is formed on a front end of the projection.

* * * * *